(12) United States Patent
Tada

(10) Patent No.: US 11,760,132 B2
(45) Date of Patent: Sep. 19, 2023

(54) PNEUMATIC TIRE

(71) Applicant: Toyo Tire Corporation, Itami (JP)

(72) Inventor: Masaru Tada, Itami (JP)

(73) Assignee: TOYO TIRE CORPORATION, Itami (JP)

(*) Notice: Subject to any disclaimer, the term of this patent is extended or adjusted under 35 U.S.C. 154(b) by 0 days.

(21) Appl. No.: 17/549,108

(22) Filed: Dec. 13, 2021

(65) Prior Publication Data

US 2022/0194139 A1 Jun. 23, 2022

(30) Foreign Application Priority Data

Dec. 21, 2020 (JP) .................... 2020-211119

(51) Int. Cl.
*B60C 11/03* (2006.01)
*B60C 11/12* (2006.01)

(52) U.S. Cl.
CPC ...... *B60C 11/0304* (2013.01); *B60C 11/0306* (2013.01); *B60C 2011/1213* (2013.01); *B60C 2011/1295* (2013.01)

(58) Field of Classification Search
CPC ......... B60C 11/0304; B60C 2011/1227; B60C 11/1236; B60C 11/03; B60C 2011/1213; B60C 2011/1295
See application file for complete search history.

(56) References Cited

U.S. PATENT DOCUMENTS

| | | | | |
|---|---|---|---|---|
| 2015/0298508 A1* | 10/2015 | Yamakawa | ......... | B60C 11/1236 152/209.21 |
| 2016/0039249 A1* | 2/2016 | Takahashi | ........... | B60C 11/0083 152/209.15 |
| 2017/0100965 A1* | 4/2017 | Kikuchi | .............. | B60C 11/1263 |
| 2018/0037066 A1* | 2/2018 | Yasunaga | ............ | B60C 11/1263 |
| 2018/0141389 A1* | 5/2018 | Yamaoka | ............ | B60C 11/1263 |

FOREIGN PATENT DOCUMENTS

| | | | | |
|---|---|---|---|---|
| DE | 202008018041 U1 * | 7/2011 | ......... | B60C 11/0302 |
| EP | 1693230 A2 * | 8/2006 | ......... | B60C 11/0304 |
| EP | 2460672 A1 * | 6/2012 | ......... | B60C 11/0302 |
| JP | 2010-274846 A | 12/2010 | | |
| JP | 2016037100 A * | 3/2016 | ............. | B60C 11/00 |
| WO | WO-2007065760 A1 * | 6/2007 | ......... | B60C 11/0304 |

OTHER PUBLICATIONS

WO 2007065760 Machine Translation; Venneberger, Martin (Year: 2007).*
EP 2460672 Machine Translation; Vermehr, Ulrich (Year: 2012).*
JP 2016-037100 Machine Translation; Sakamoto, Sachio (Year: 2016).*
EP 1693230 English Machine Translation; Deinsthuber F (Year: 2006).*
DE 202008014041 English Machine Translation (Year: 2011).*

* cited by examiner

Primary Examiner — Robert C Dye
Assistant Examiner — Nicholas J Weiler
(74) Attorney, Agent, or Firm — WHDA, LLP

(57) ABSTRACT

In a pneumatic tire, a center land comprises a plurality of center sipes, all of the center sipes are respectively contiguous with a first end and a second end in a tire axial direction of the center land, a first shoulder land comprises a plurality of first shoulder sipes, and all of the first shoulder sipes are contiguous with an outer end in the tire axial direction of the first shoulder land but are separated from an inner end in the tire axial direction of the first shoulder land.

20 Claims, 8 Drawing Sheets

PNEUMATIC TIRE

CROSS REFERENCE TO RELATED APPLICATIONS

This application claims the benefit of priority of Japanese application no. 2020-211119, filed on Dec. 21, 2020, which is incorporated herein by reference.

BACKGROUND OF THE INVENTION

Field of the Invention

The present disclosure relates to a pneumatic tire.

Description of the Related Art

Conventionally a pneumatic tire might, for example, comprise a plurality of main grooves extending in the tire circumferential direction, and a plurality of lands which are partitioned by the plurality of main grooves and a pair of contact patch ends (e.g., JP 2010-274846 A). In addition, a land might comprise a plurality of sipes, the sipes all being respectively contiguous with both ends in the tire axial direction of the land.

As a result, because the sipes will tend to deform so as to become wider, this will make it possible to achieve increase in traction attributable to edges of sipes when on a snowy road surface. It will therefore be possible to improve performance on snowy road surfaces. However, the fact that the sipes tend to deform means that there will be reduced rigidity at the land. This will cause reduction in performance on dry road surfaces as exemplified by braking performance and performance with respect to stability in handling.

SUMMARY OF THE INVENTION

It is therefore an object of the present disclosure to provide a pneumatic tire such as will make it possible to suppress lowering of land rigidity while ensuring good performance on snowy road surfaces.

There is provided a pneumatic tire comprises a plurality of main grooves extending in a tire circumferential direction, and a plurality of lands that are partitioned by the plurality of main grooves and a pair of contact patch ends; wherein the plurality of lands comprise first and second shoulder lands arranged so as to be outwardmost in a tire axial direction, and a center land arranged so as to be nearest a tire equatorial plane;

the center land comprises a plurality of center sipes;

all of the center sipes are respectively contiguous with a first end and a second end in the tire axial direction of the center land;

the first shoulder land comprises a plurality of first shoulder sipes; and all of the first shoulder sipes are contiguous with an outer end in the tire axial direction of the first shoulder land but are separated from an inner end in the tire axial direction of the first shoulder land.

DETAILED DESCRIPTION OF THE INVENTION

Figure 1:
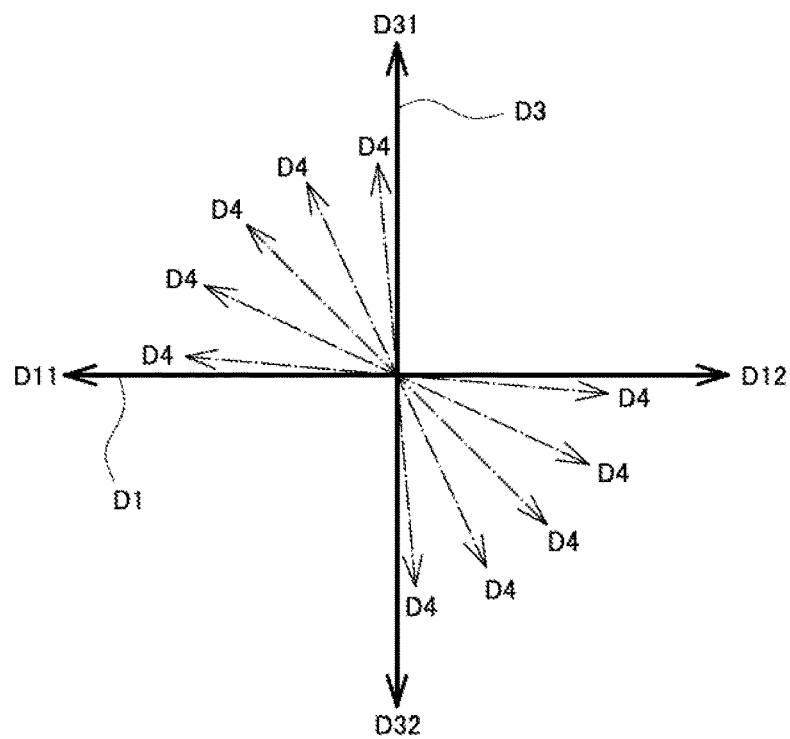
FIG. 1 is a drawing for explaining a first inclined direction.

Below, an embodiment of a pneumatic tire is described with reference to FIG. 1 through FIG. 9. At the respective drawings, note that dimensional ratios at the drawings and actual dimensional ratios are not necessarily consistent, and note further that dimensional ratios are not necessarily consistent from drawing to drawing.

Note that the respective dimensions, positional relationships, relative magnitudes, and so forth that are indicated below should be understood to be as measured under normal conditions when the pneumatic tire (hereinafter also referred to as simply "tire") 1 mounted on a normal rim 20 and inflated to normal internal pressure is under no load. A normal rim is that particular rim which is specified for use with a particular tire 1 in the context of the body of standards that contains the standard that applies to the tire 1 in question, this being referred to, for example, as a standard rim in the case of JATMA, or a measuring rim in the cases of TRA and ETRTO.

Furthermore, normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of TRA, or "inflation pressure" in the case of ETRTO.

At the respective drawings, first direction D1 is the tire axial direction D1 which is parallel to the tire rotational axis that is the center of rotation of tire 1, second direction D2 is the tire radial direction D2 which is the direction of the diameter of tire 1, and third direction D3 is the tire circumferential direction D3 which is circumferential with respect to the rotational axis of the tire.

Toward the interior in the tire axial direction D1 means nearer to tire equatorial plane S1, and toward the exterior in the tire axial direction D1 means farther away from tire equatorial plane S1. Furthermore, the side toward the interior in the tire radial direction D2 is the side which is nearer to the tire rotational axis, and the side toward the exterior in the tire radial direction D2 is the side which is farther away from the tire rotational axis.

First direction D11 of tire axial direction D1 is also referred to as first axial direction D11; second direction D12 of tire axial direction D1 is also referred to as second axial direction D12. Furthermore, first direction D31 of tire circumferential direction D3 is also referred to as first circumferential direction D31; second direction D32 of tire circumferential direction D3 is also referred to as second circumferential direction D32.

Tire equatorial plane S1 refers to a plane that is located centrally in the tire axial direction D1 of tire 1 and that is perpendicular to the rotational axis of the tire; tire meridional planes refer to planes that are perpendicular to tire equatorial plane S1 and that contain the rotational axis of the tire. Furthermore, the tire equator is the line formed by the intersection of tire equatorial plane S1 and the outer surface (tread surface 2a, described below) in the tire radial direction D2 of tire 1.

Figure 2:
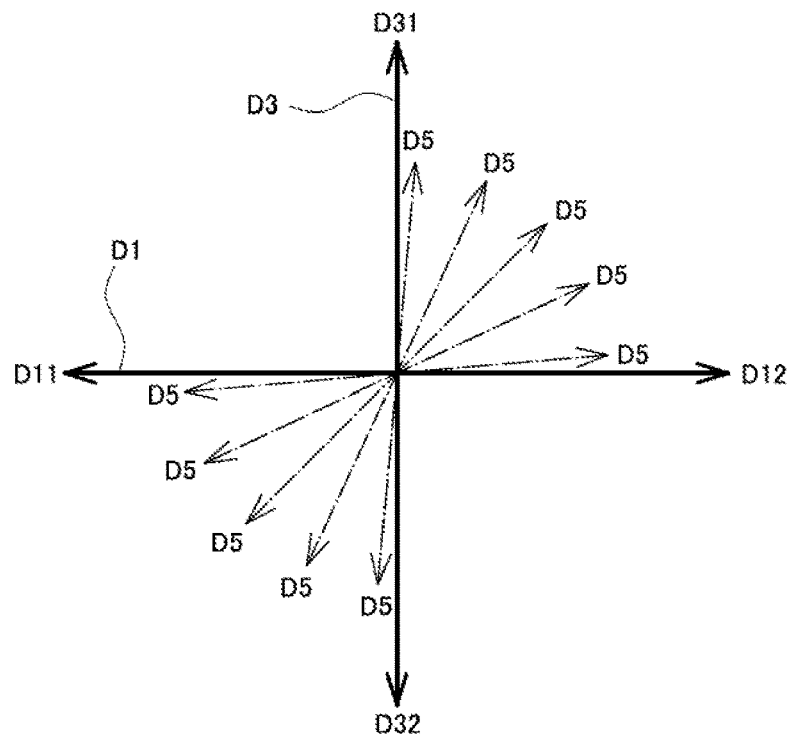
FIG. 2 is a drawing for explaining a second inclined direction.

Note, as shown in FIG. 1, that the direction D4 which is inclined so as to be increasingly directed toward first circumferential direction D31 as one proceeds toward first axial direction D11 (the direction which is inclined so as to be increasingly directed toward second circumferential direction D32 as one proceeds toward second axial direction D12) will be referred to as first inclined direction D4. Furthermore, as shown in FIG. 2, the direction D5 which is inclined so as to be increasingly directed toward second circumferential direction D32 as one proceeds toward first axial direction D11 (the direction which is inclined so as to be increasingly directed toward first circumferential direction D31 as one proceeds toward second axial direction D12) will be referred to as second inclined direction D5.

In addition, where it is said that the direction in which something is inclined with respect to tire circumferential direction D3 (tire axial direction D1) is the same as the direction in which something else is inclined with respect thereto, this means that the two are inclined in the same direction with respect thereto (e.g., when the two are mutually in first inclined directions D4, D4 or the two are mutually in second inclined directions D5, D5). That is, where it is said that the direction in which something is inclined with respect to tire circumferential direction D3 (tire axial direction D1) is the same as the direction in which something else is inclined with respect thereto, this should be understood to include the situation in which the two are inclined in the same direction D4, D4 (D5, D5) notwithstanding the fact that the angles of inclination thereof with respect to tire circumferential direction D3 (tire axial direction D1) may be different.

Furthermore, where it is said that the direction in which something is inclined with respect to tire circumferential direction D3 (tire axial direction D1) is opposite the direction in which something else is inclined with respect thereto, this means that the two are inclined in opposite directions (first inclined direction D4 and second inclined direction D5). That is, where it is said that the direction in which something is inclined with respect to tire circumferential direction D3 (tire axial direction D1) is opposite the direction in which something else is inclined with respect thereto, this should be understood to include the situation in which the two are inclined in opposite directions D4, D5 notwithstanding the fact that the angles of inclination thereof with respect to tire circumferential direction D3 (tire axial direction D1) may be the same.

Figure 3:
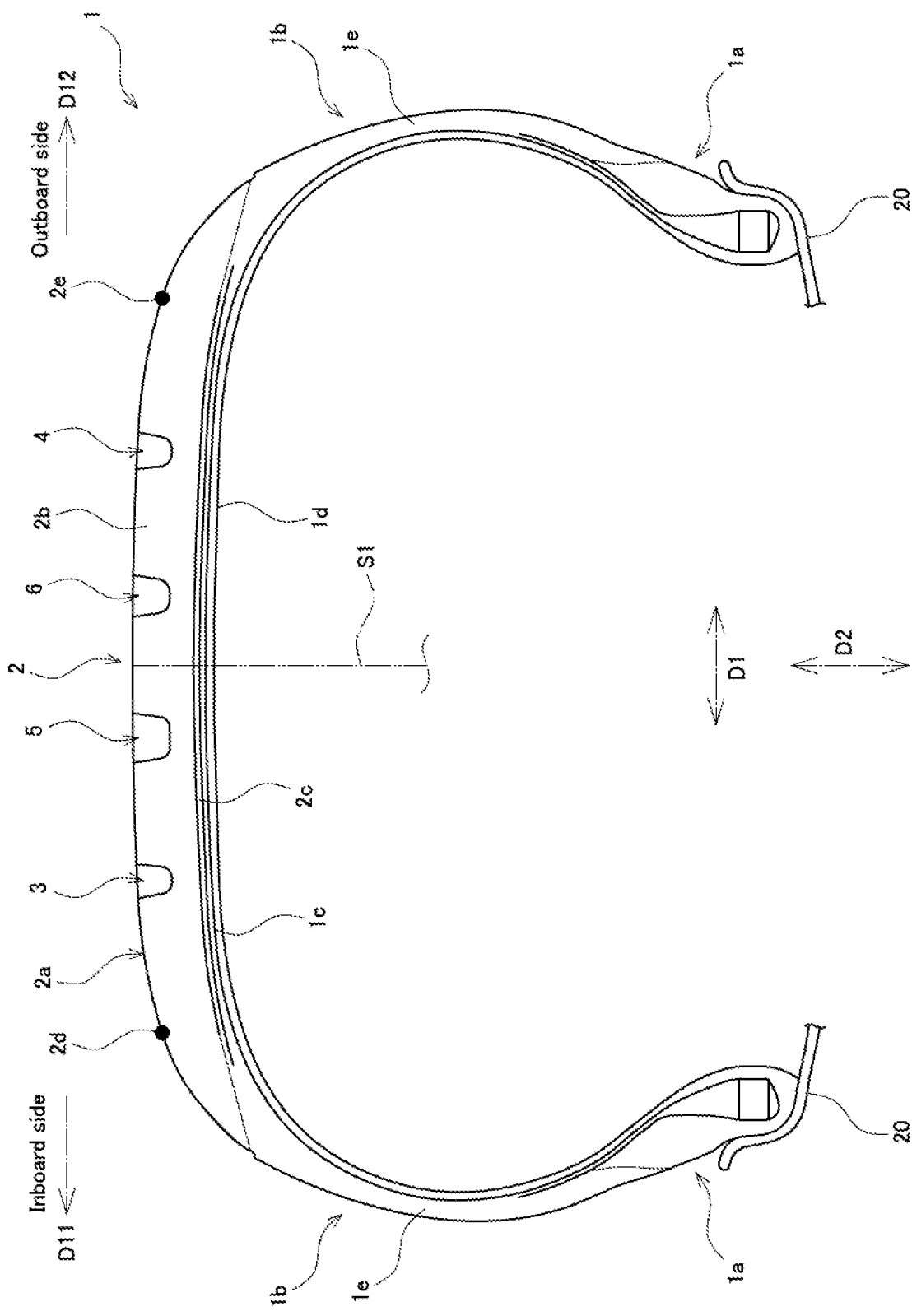
FIG. 3 is a view of a section, taken along a tire meridional plane, of the principal components in a pneumatic tire associated with an embodiment.

As shown in FIG. 3, tire 1 associated with the present embodiment comprises a pair of beads 1a at which bead cores are present; sidewalls 1b which extend outwardly in the tire radial direction D2 from the respective beads 1a; and tread 2, the exterior surface (tread surface 2a) in the tire radial direction D2 of which contacts the road surface and which is contiguous with the outer ends in the tire radial direction D2 of the pair of sidewalls 1b. In accordance with the present embodiment, tire 1 is a pneumatic tire 1, the interior of which is capable of being filled with air, and which is capable of being mounted on a rim 20.

Furthermore, tire 1 comprises carcass 1c which spans the pair of bead cores, and inner liner 1d which is arranged at a location toward the interior from carcass 1c and which has superior functionality in terms of its ability to impede passage of gas therethrough so as to permit air pressure to be maintained. Carcass 1c and inner liner 1d are arranged in parallel fashion with respect to the inner circumference of the tire over a portion thereof that encompasses beads 1a, sidewalls 1b, and tread 2.

Tire 1 has a structure that is asymmetric with respect to tire equatorial plane S1. In accordance with the present embodiment, tire 1 is a tire for which a vehicle mounting direction is indicated, which is to say that there is an indication of whether the left or the right side of the tire should be made to face the vehicle when tire 1 mounted on rim 20. Moreover, the tread pattern formed at tread surface 2a of tread 2 is shaped in asymmetric fashion with respect to tire equatorial plane S1.

For example, the orientation in which the tire is to be mounted on the vehicle may be indicated at sidewall 1b. More specifically, a constitution may be adopted in which sidewall 1b is provided with sidewall rubber 1e which is arranged toward the exterior in the tire axial direction D1 from carcass 1c so as to constitute the tire exterior surface, said sidewall rubber 1e having at the surface thereof an indicator region (not shown) that indicates an orientation in which the tire is to be mounted on the vehicle.

For example, one sidewall 1b, i.e., that which is to be arranged toward the interior when the tire is mounted on the vehicle (hereinafter also referred to as the "inboard side"), might be marked (e.g., with the word "INSIDE" or the like) so as to contain an indication to the effect that it is for the inboard side. Furthermore, for example, the other sidewall 1b, i.e., that which is to be arranged toward the exterior when the tire is mounted on the vehicle (hereinafter also referred to as the "outboard side"), might be marked (e.g., with the word "OUTSIDE" or the like) so as to contain an indication to the effect that it is for the outboard side. While there is no particular limitation with respect thereto, the side toward first axial direction D11 might, e.g., as is the case in the present embodiment, be taken to be the inboard side, and the side toward second axial direction D12 might be taken to be the outboard side.

Tread 2 is provided with tread rubber 2b having tread surface 2a which contacts the road surface, and belt 2c which is arranged between tread rubber 2b and carcass 1c. In addition, present at tread surface 2a is the contact patch that actually comes in contact with the road surface, the portions within said contact patch that are present at the outer ends in the tire axial direction D1 being referred to as contact patch ends 2d, 2e. Note that said contact patch refers to the tread surface 2a that comes in contact with the road surface when a normal load is applied to a tire 1 mounted on a normal rim 20 when the tire 1 is inflated to normal internal pressure and is placed in vertical orientation on a flat road surface.

Normal load is that load which is specified for use with a particular tire 1 in the context of the body of standards that contains the standard that applies to the tire 1 in question, this being "maximum load capacity" in the case of JATMA, the maximum value listed at the aforementioned table in the case of TRA, or "load capacity" in the case of ETRTO, which when tire 1 is to be used on a passenger vehicle is taken to be 85% of the load corresponding to an internal pressure of 180 kPa.

Figure 4:
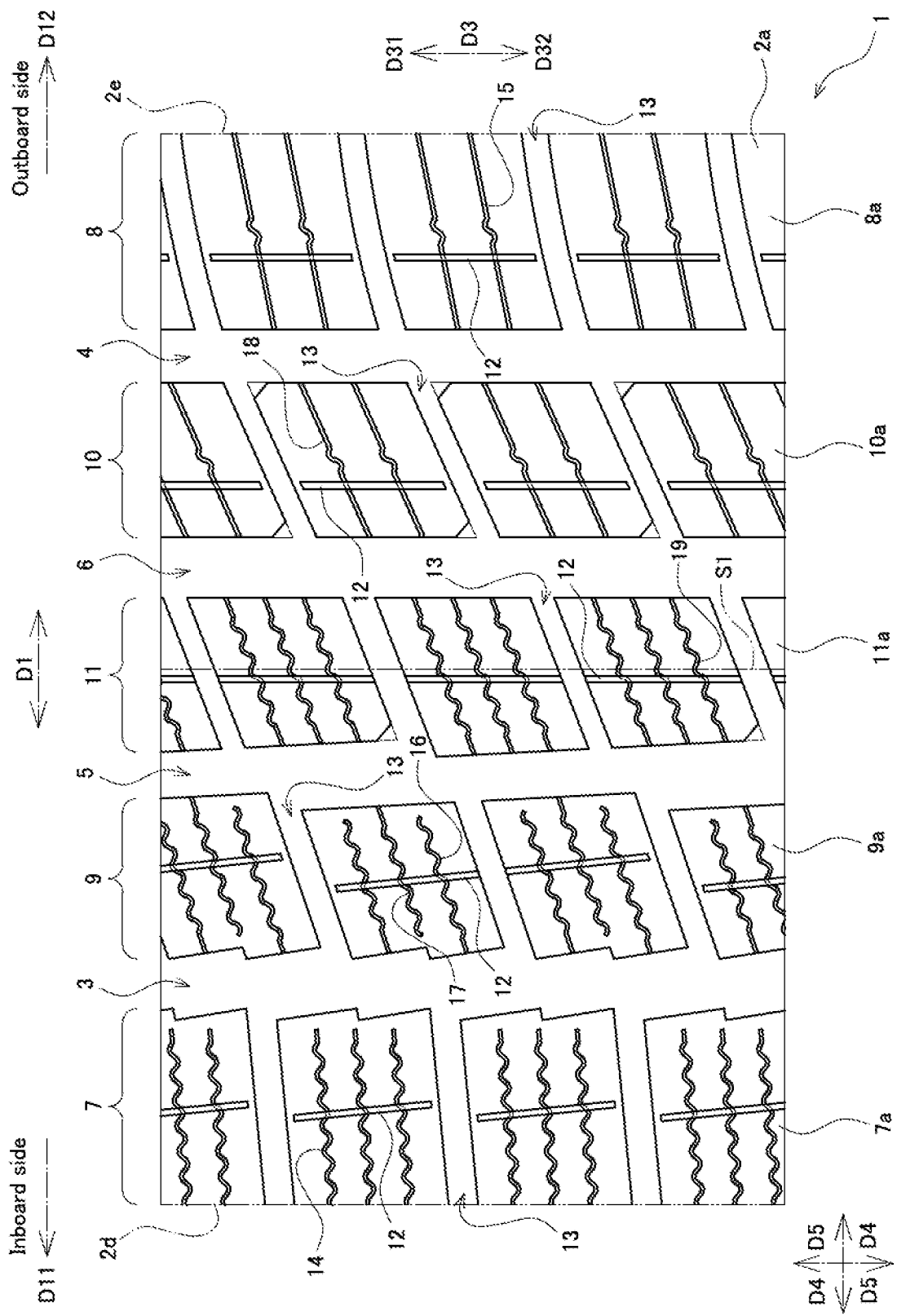
FIG. 4 is a drawing showing the principal components at the tread surface of a pneumatic tire associated with same embodiment as they would exist if unwrapped so as to lie in a single plane.

As shown in FIG. 3 and FIG. 4, tread rubber 2b comprises a plurality of main grooves 3, 4, 5, 6 that extend in the tire circumferential direction D3, and a plurality of lands 7, 8, 9, 10, 11 which are partitioned by the plurality of main grooves 3, 4, 5, 6 and a pair of contact patch ends 2d, 2e. While there is no particular limitation with respect thereto, the number of main grooves 3, 4, 5, 6 that are present might, e.g., as is the case in the present embodiment, be four, and the number of lands 7, 8, 9, 10, 11 that are present might be five.

Main grooves 3, 4, 5, 6 extend continuously in the tire circumferential direction D3. Main grooves 3, 4, 5, 6 might, for example, be provided with so-called tread wear indicators (not shown) which are portions at which depth of the groove is reduced so as to make it possible to ascertain the extent to which wear has occurred as a result of the exposure thereof that takes place in accompaniment to wear. Furthermore, main grooves 3, 4, 5, 6 might, for example, have groove widths that are each not less than 3% of the distance (dimension in the tire axial direction D1) between contact patch ends 2d, 2e. Furthermore, main grooves 3, 4, 5, 6 might, for example, have groove widths that are each not less than 5 mm.

The pair of main grooves 3, 4 arranged in outermost fashion in the tire axial direction D1 are referred to as shoulder main grooves 3, 4. Of the shoulder main grooves 3, 4, that main groove 3 which is arranged on the side in the first axial direction D11 (the inboard side) is referred to as first shoulder main groove 3, and that main groove 4 which is arranged on the side in the second axial direction D12 (the outboard side) is referred to as second shoulder main groove 4.

Furthermore, the main grooves 5, 6 arranged between the pair of shoulder main grooves 3, 4 are referred to as center main grooves 5, 6. Of the center main grooves 5, 6, that main groove 5 which is arranged on the side in the first axial direction D11 (the inboard side) is referred to as first center main groove 5, and that main groove 6 which is arranged on the side in the second axial direction D12 (the outboard side) is referred to as second center main groove 6.

Lands 7, 8 which are partitioned by a contact patch end 2d, 2e and a shoulder main groove 3, 4 are referred to as shoulder lands 7, 8; lands 9, 10, 11 which are partitioned by a pair of adjacent main grooves 3, 4, 5, 6 are referred to as middle lands 9, 10, 11. Note that middle lands 9, 10 which are partitioned by a center main groove 5, 6 and a shoulder main groove 3, 4 are also referred to as mediate lands 9, 10; middle land 11 which is partitioned by the pair of center main grooves 5, 6 is also referred to as center land 11.

Of the shoulder lands 7, 8, that land 7 which is arranged on the side in the first axial direction D11 (the inboard side) is referred to as first shoulder land 7, and that land 8 which is arranged on the side in the second axial direction D12 (the outboard side) is referred to as second shoulder land 8. Furthermore, of the mediate lands 9, 10, that land 9 which is arranged on the side in the first axial direction D11 (the inboard side) is referred to as first mediate land 9, and that land 10 which is arranged on the side in the second axial direction D12 (the outboard side) is referred to as second mediate land 10.

While there is no particular limitation with respect thereto, main grooves 3, 4, 5, 6 may, e.g., as is the case in the present embodiment, comprise straight main grooves 4, 6 and zigzag main grooves 3, 5. Note that straight main grooves 4, 6 are main grooves 4, 6 at which end edges at tread surface 2a are respectively parallel to the tire circumferential direction D3; zigzag main grooves 3, 5 are main grooves 3, 5 at which end edges at tread surface 2a are respectively inclined with respect to the tire circumferential direction D3.

Lands 7, 8, 9, 10, 11 comprise a plurality of ancillary grooves 12, 13, . . . , 18, 19. Of ancillary grooves 12, 13, . . . , 18, 19, those ancillary grooves 12 which extend in the tire circumferential direction D3 are referred to as circumferential grooves 12; of ancillary grooves 12, 13, . . . , 18, 19, those ancillary grooves 13, 14, . . . , 18, 19 which extend in the tire axial direction D1 are referred to as axial grooves 13, 14, . . . , 18, 19.

In addition, of axial grooves 13, 14, . . . , 18, 19, those axial grooves 13 for which the groove width at tread surface 2a is not less than 1.6 mm are referred to as slits 13. Furthermore, of axial grooves 13, 14, . . . , 18, 19, those axial grooves 14, 15, . . . , 18, 19 for which the groove width at tread surface 2a is less than 1.6 mm are referred to as sipes 14, 15, . . . , 18, 19.

Note that the angles of inclination of circumferential grooves 12 with respect to the tire circumferential direction D3 are less than 45°, it being preferred, for example, that these be not greater than 30°. Furthermore, the angles of inclination of axial grooves 13, 14, . . . , 18, 19 with respect to tire axial direction D1 are not greater than 45°, it being preferred, for example, that these be not greater than 30°.

While there is no particular limitation with respect thereto, slits 13 may, e.g., as is the case in the present embodiment, all extend along the full length in the tire axial direction D1 of lands 7, 8, 9, 10, 11. That is, each of the two ends of each slit 13 may respectively be contiguous with a main groove 3, 4, 5, 6 or a contact patch end 2d, 2e. As a result, lands 7, 8, 9, 10, 11 comprise a plurality of blocks 7a, 8a, 9a, 10a, 11a which are partitioned by slits 13 so as to as to be arrayed in the tire circumferential direction D3.

While there is no particular limitation with respect thereto, note that the number of blocks 7a, 8a, 9a, 10a, 11a in the respective lands 7, 8, 9, 10, 11 may, e.g., as is the case in the present embodiment, be the same, and/or the number of slits 13 in the respective lands 7, 8, 9, 10, 11 may be the same. Furthermore, while there is no particular limitation with respect thereto, the groove widths of slits 13 may, e.g., as is the case in the present embodiment, be constant (here understood to mean not only the situation in which these are the same but to also include situations in which these are approximately the same such that there is a difference of ±5% therebetween) everywhere along the full lengths thereof.

The constitutions of sipes 14, 16, 17 of lands 7, 9 on the inboard side (the side toward first axial direction D11), and of sipes 15, 18 of lands 8, 10 on the outboard side (the side toward second axial direction D12), will now be described with reference to FIG. 5 through FIG. 9.

As shown in FIG. 5 through FIG. 9, sipes 14, 15, . . . , 18, 19 may, for example, comprise straight portions 14a, 15a, . . . , 18a, 19a which extend in straight fashion, and zigzag portions 14b, 15b, . . . , 18b, 19b which extend in zigzag fashion. Note that sipes 14, 15, . . . , 18, 19 might, for example, be made up only straight portions 14a, 15a, . . . , 18a, 19a or might, for example, be made up only zigzag portions 14b, 15b, . . . , 18b, 19b.

It should first be noted that the number of sipes 14 at first shoulder land 7 is greater than the number of sipes 15 at second shoulder land 8. In addition, total length of sipes 14 at first shoulder land 7 is greater than total length of sipes 15 at second shoulder land 8.

Furthermore, the number of sipes 16, 17 at first mediate land 9 may, e.g., as is the case in the present embodiment, be greater than the number of sipes 18 at second mediate land 10. In addition, total length of sipes 16, 17 at first mediate land 9 might, for example, be greater than total length of sipes 18 at second mediate land 10.

Thus, at lands 7, 9 which are arranged so that the entireties thereof are toward first axial direction D11 (toward the inboard side) from tire equatorial plane S1, the fact that lengths of sipes 14, 16, 17 are greater makes it possible to achieve increase in traction attributable to edges of sipes 14, 16, 17 at lands 7, 9 toward first axial direction D11 (toward the inboard side). As a result, it will be possible to improve performance on snowy road surfaces.

Moreover, at lands 8, 10 which are arranged so that the entireties thereof are toward second axial direction D12 (toward the outboard side) from tire equatorial plane S1, the fact that lengths of sipes 15, 18 are suppressed from becoming too large makes it possible to suppress reduction in rigidity of lands 8, 10 toward second axial direction D12 (toward the outboard side). As a result, it will be possible to improve performance on dry road surfaces (especially performance with respect to stability in handling during turns).

Accordingly, it will be possible to achieve both performance on dry road surfaces as a result of ensuring rigidity and performance on snowy road surfaces as a result of provision of traction. As a result, while there is no particular limitation with respect thereto, tire 1 associated with the present embodiment is capable of being used as an all-season tire (a tire suitable for dry road surfaces and snowy road surfaces). Note that what are referred to as the lengths of sipes 14, 15, . . . , 18, 19 (and the same is true of the lengths of respective portions 14a, 14b, 15a, 15b, . . . , 18a, 18b, 19a, 19b, described below) are the lengths along the midpoints of the groove widths of sipes 14, 15, . . . , 18, 19.

Furthermore, at sipes 14, 16, 17 of lands 7, 9 toward first axial direction D11 (toward the inboard side), lengths of zigzag portions 14b, 16b, 17b may, e.g., as is the case in the present embodiment, be greater than lengths of straight portions 14a, 16a, 17a. As a result, because it is possible to increase lengths of sipes 14, 16, 17, it is possible to achieve increase in traction attributable to edges of sipes 14, 16, 17.

Furthermore, at sipes 15, 18 of lands 8, 10 toward second axial direction D12 (toward the outboard side), lengths of straight portions 15a, 18a may, e.g., as is the case in the present embodiment, be greater than lengths of zigzag portions 15b, 18b. As a result, because the lengths of sipes 15, 18 are suppressed from becoming too large, this makes it possible to suppress reduction in rigidity at lands 8, 10.

Thus, the fractional amount of zigzag portions at sipes 14, 16, 17 of lands 7, 9 toward first axial direction D11 (toward the inboard side) may, e.g., as is the case in the present embodiment, be greater than the fractional amount of zigzag portions at sipes 15, 18 of lands 8, 10 toward second axial direction D12 (toward the outboard side). Note that what is referred to as the fractional amount of zigzag portions is the ratio of the total lengths of zigzag portions 14b, 15b, . . . , 18b, 19b to the total lengths of sipes 14, 15, . . . , 18, 19.

The fractional amount of zigzag portions at sipes 14 of first shoulder land 7 may, e.g., as is the case in the present embodiment, be greater than the fractional amount of zigzag portions at sipes 15 of second shoulder land 8. Furthermore, the fractional amount of zigzag portions at sipes 16, 17 of first mediate land 9 may, e.g., as is the case in the present embodiment, be greater than the fractional amount of zigzag portions at sipes 18 of second mediate land 10.

Moreover, at sipe 19 in center land 11, length of zigzag portion 19b may, e.g., as is the case in the present embodiment, be greater than length of straight portion 19a. Furthermore, the fractional amount of zigzag portions at sipes 19 of center land 11 may, e.g., as is the case in the present embodiment, be greater than the fractional amount of zigzag portions at sipes 15 of second shoulder land 8, and/or may be greater than the fractional amount of zigzag portions at sipes 18 of second mediate land 10.

Next, the constitutions of respective lands 7, 8, 9, 10, 11 will be described with reference to FIG. 5 through FIG. 9.

The constitution of second shoulder land 8 will first be described with reference to FIG. 5.

Figure 5:
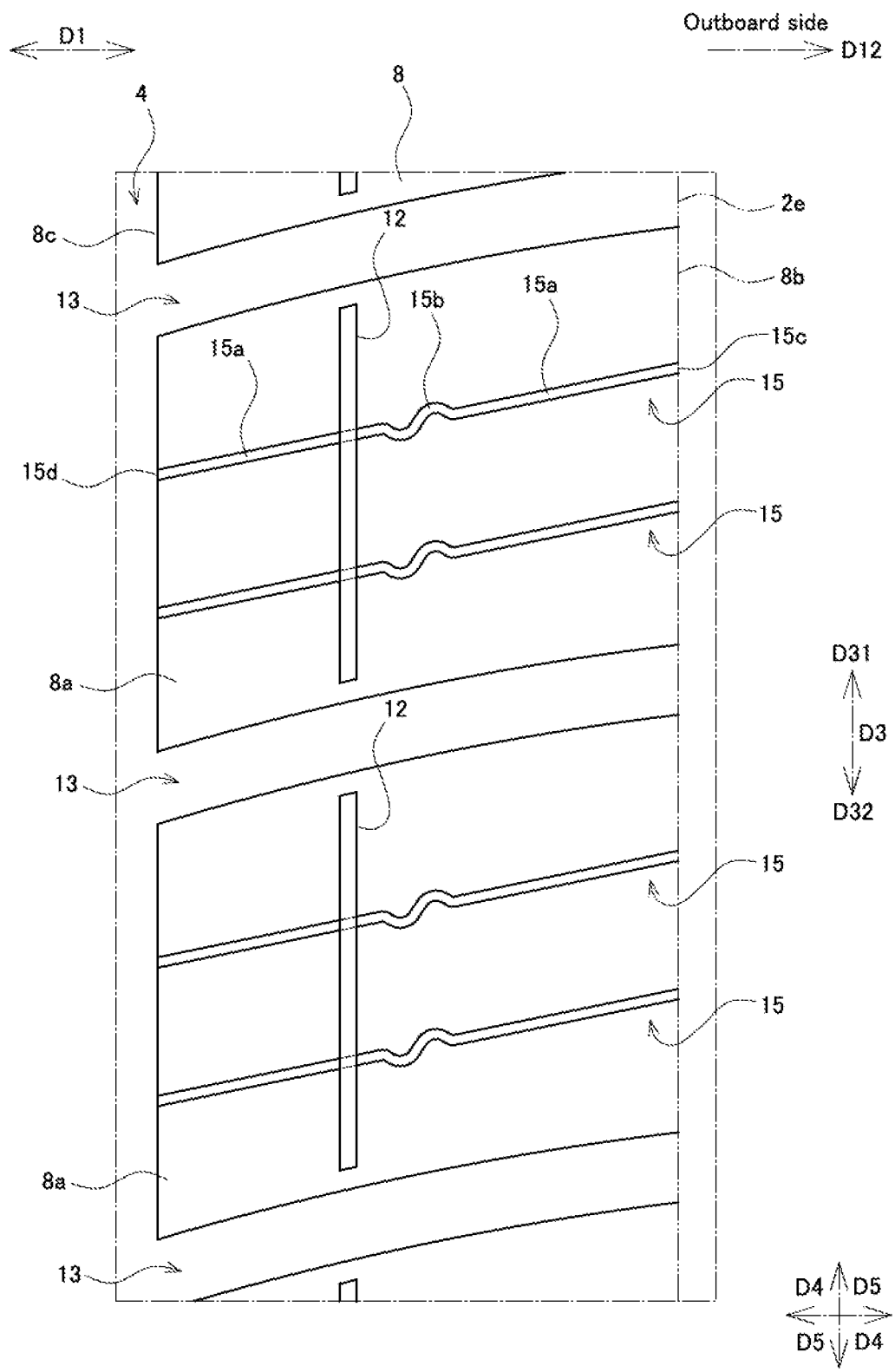
FIG. 5 is a drawing showing the principal components of a second shoulder land associated with same embodiment as they would exist if unwrapped so as to lie in a single plane.

As shown in FIG. 5, at second shoulder land 8, lengths of sipes (sometimes referred to as "second shoulder sipes") 15 have been suppressed from becoming too large. As a result, although it will be possible to ensure rigidity, traction attributable to edges of sipes 15 will tend to be small.

First ends (outer ends in the tire axial direction D1) 15c of all sipes 15 are therefore contiguous with outer end 8b in the tire axial direction D1 of second shoulder land 8, and second ends (inner ends in the tire axial direction D1) 15d of all sipes 15 are contiguous with inner end 8c in the tire axial direction D1 of second shoulder land 8. That is, first end 15c of sipe 15 is contiguous with second contact patch end 2e, and second end 15d of sipe 15 is contiguous with second shoulder main groove 4.

As a result, because sipes 15 will tend to deform so as to become wider, this will make it possible to increase traction attributable to edges of sipes 15 when on a snowy road surface. Accordingly, at second shoulder land 8, it will be possible, for example, to achieve both performance on snowy road surfaces as a result of provision of traction and performance on dry road surfaces as a result of ensuring rigidity.

Moreover, a constitution may be adopted in which, e.g., as is the case in the present embodiment, a pair of straight portions 15a are arranged at either end in the tire axial direction D1 of sipe 15, and zigzag portion 15b is arranged between the pair of straight portions 15a, 15a. Furthermore, sipes 15 and slits 13 of second shoulder land 8 may, e.g., as is the case in the present embodiment, be inclined in the same direction (second inclined direction) D5 with respect to the tire axial direction D1.

Next, the constitution of second mediate land 10 will be described with reference to FIG. 6.

Figure 6:
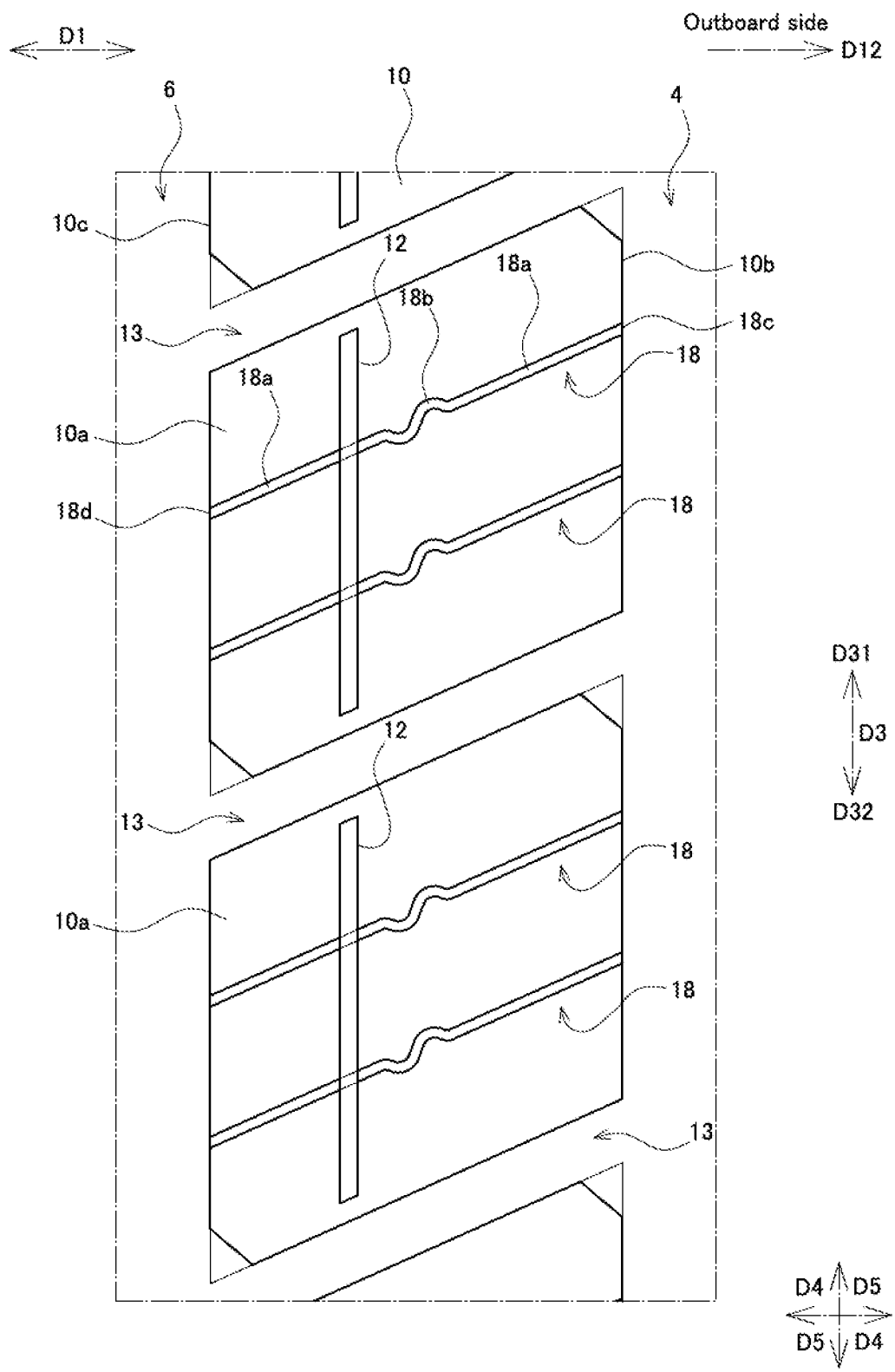
FIG. 6 is a drawing showing the principal components of a second mediate land associated with same embodiment as they would exist if unwrapped so as to lie in a single plane.

As shown in FIG. 6, at second mediate land 10, lengths of sipes (sometimes referred to as "third mediate sipes") 18 have been suppressed from becoming too large. As a result, although it will be possible to ensure rigidity, traction attributable to edges of sipes 18 will tend to be small.

A constitution may therefore be adopted in which, e.g., as is the case in the present embodiment, first ends (outer ends in the tire axial direction D1) 18c of all sipes 18 are contiguous with outer end 10b in the tire axial direction D1 of second mediate land 10, and second ends (inner ends in the tire axial direction D1) 18d of all sipes 18 are contiguous with inner end 10c in the tire axial direction D1 of second mediate land 10. That is, a constitution may be adopted in which first end 18c of sipe 18 is contiguous with second shoulder main groove 4, and second end 18d of sipe 18 is contiguous with second center main groove 6.

As a result, because sipes 18 will tend to deform so as to become wider, this will make it possible to increase traction attributable to edges of sipes 18 when on a snowy road surface. Accordingly, at second mediate land 10, it will be possible, for example, to achieve both performance on snowy road surfaces as a result of provision of traction and performance on dry road surfaces as a result of ensuring rigidity.

Moreover, a constitution may be adopted in which, e.g., as is the case in the present embodiment, a pair of straight portions 18a are arranged at either end in the tire axial direction D1 of sipe 18, and zigzag portion 18b is arranged between the pair of straight portions 18a, 18a. Furthermore, sipes 18 and slits 13 of second mediate land 10 may, e.g., as is the case in the present embodiment, be inclined in the same direction (second inclined direction) D5 with respect to the tire axial direction D1.

Next, the constitution of first shoulder land 7 will be described with reference to FIG. 9.

Figure 9:
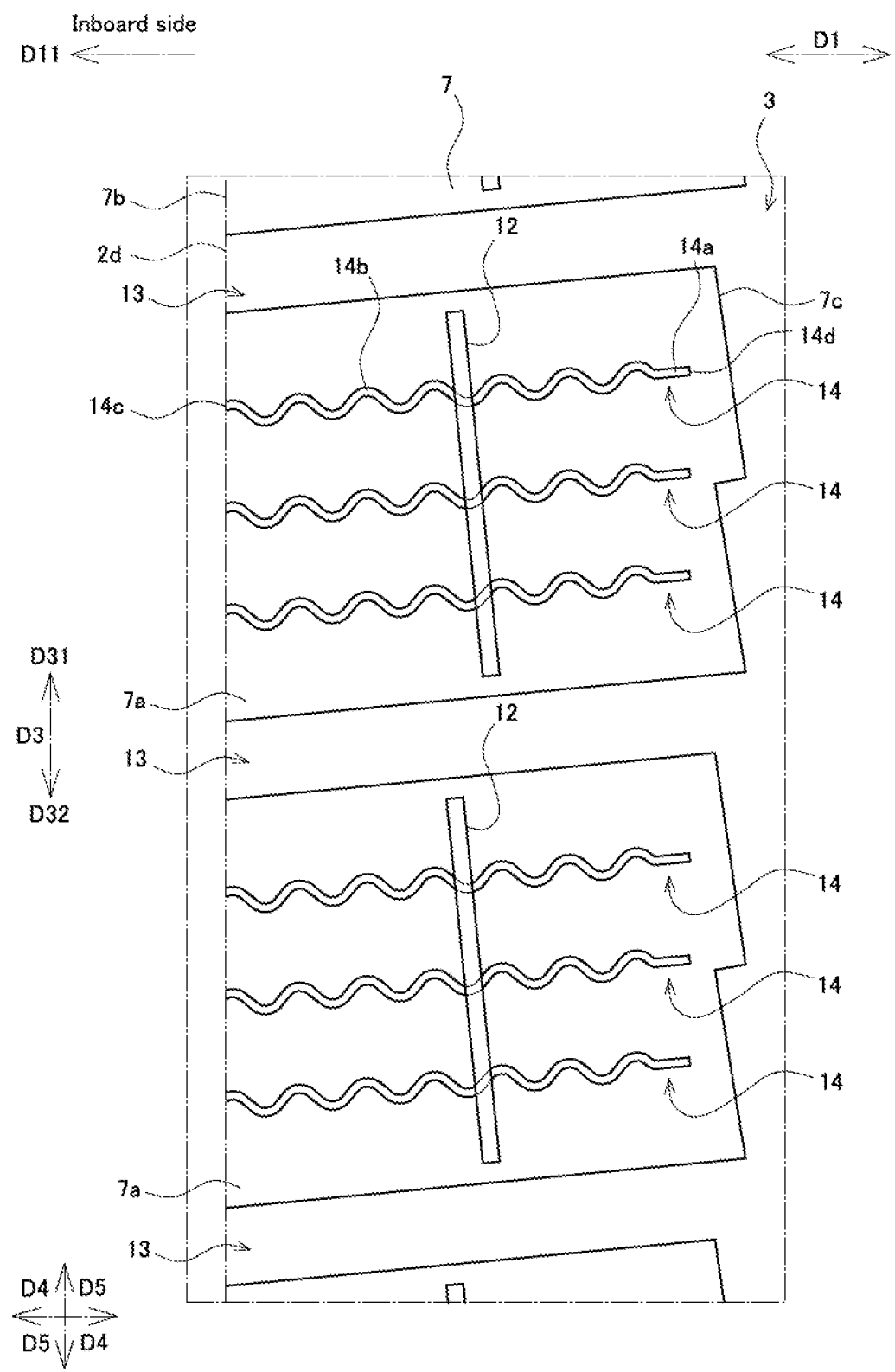
FIG. 9 is a drawing showing the principal components of a first shoulder land associated with same embodiment as they would exist if unwrapped so as to lie in a single plane.

As shown in FIG. 9, at first shoulder land 7, because lengths of sipes (sometimes referred to as "first shoulder sipes") 14 are large, it is possible to increase traction attributable to edges of sipes 14, but there is a tendency for rigidity to be reduced. Second ends (inner ends in the tire axial direction D1) 14d of all sipes 14 are therefore separated from inner end 7c in the tire axial direction D1 of first shoulder land 7. That is, second end 14d of sipe 14 is separated from first shoulder main groove 3.

As a result, because it will be possible to suppress lowering of rigidity at first shoulder land 7, it will be possible to improve performance on dry road surfaces (especially performance with respect to braking). Accordingly, at first shoulder land 7, it will be possible, for example, to achieve both performance on dry road surfaces as a result of ensuring rigidity and performance on snowy road surfaces as a result of provision of traction.

Moreover, when the vehicle is driven, the actual locations of the contact patch ends will vary in the tire axial direction D1. When under a heavy load, for example, the actual locations of the contact patch ends will be toward the exterior in the tire axial direction D1 from first and second contact patch ends 2d, 2e; when under a light load, for example, the actual locations of the contact patch ends will be toward the interior in the tire axial direction D1 from first and second contact patch ends 2d, 2e.

To address this, sipe 14 is separated not from outer end 7b of first shoulder land 7 but from inner end 7c of first shoulder land 7. As a result, even in situations in which the actual locations of the contact patch ends vary in the tire axial direction D1, it will be possible to cause second ends 14d of sipe 14 to be definitively separated from inner end 7c of first shoulder land 7. Accordingly, it will be possible to definitively suppress lowering of rigidity at first shoulder land 7.

Moreover, first ends (outer ends in the tire axial direction D1) 14c of all sipes 14 are contiguous with outer end 7b in the tire axial direction D1 of first shoulder land 7. That is, first end 14c of each sipe 14 is contiguous with first contact patch end 2d.

As a result, because it is possible to ensure that sipes 14 will tend to widen, it is possible to suppress occurrence of a situation in which traction attributable to edges of sipes 14 might otherwise be reduced. Moreover, it is preferred that length in the tire axial direction D1 of sipe 14 be, for example, not less than 67% (=2/3) of length (e.g., maximum length) in the tire axial direction D1 of block 7a, and it is more preferred that this be, for example, not less than 75% (=3/4) thereof.

Furthermore, a constitution may be adopted in which, e.g., as is the case in the present embodiment, straight portion 14a is arranged toward the interior in the tire axial direction D1 of sipe 14, and zigzag portion 14b is arranged toward the exterior in the tire axial direction D1 of sipe 14. Furthermore, sipes 14 and slits 13 of first shoulder land 7 may, e.g., as is the case in the present embodiment, be inclined in the same direction (second inclined direction) D5 with respect to the tire axial direction D1.

Next, the constitution of center land 11 will be described with reference to FIG. 7.

For example, when the vehicle is going straight ahead, contact patch length (length in the tire circumferential direction D3) in regions toward the interior in the tire axial direction D1 (particularly, at center land 11) might increase. As a result, many sipes (sometimes referred to as "center sipes") 19 at center land 11 will come in contact with the ground.

Figure 7:
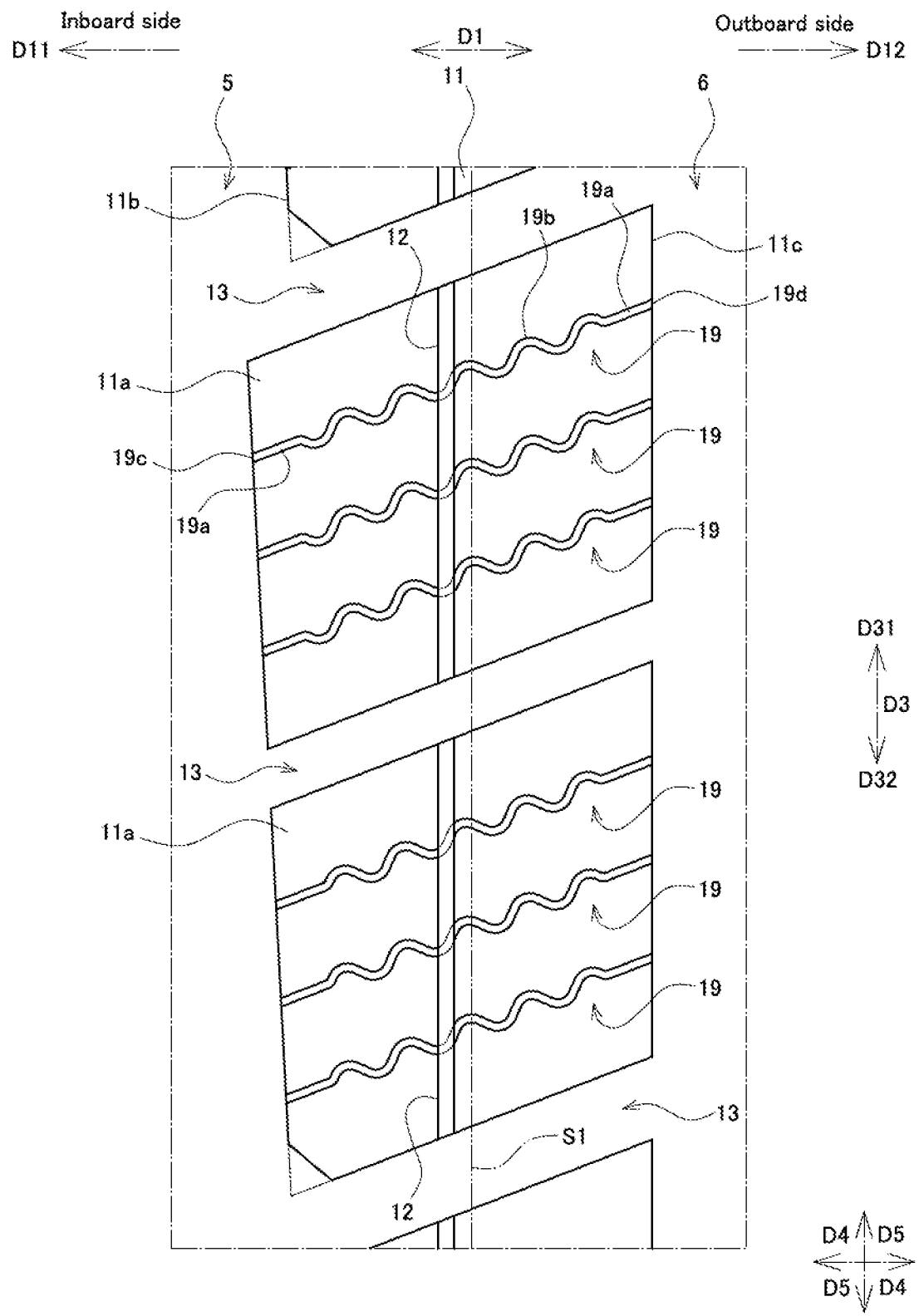
FIG. 7 is a drawing showing the principal components of a center land associated with same embodiment as they would exist if unwrapped so as to lie in a single plane.

To address this, as shown in FIG. 7, at center land 11, first ends 19c of all sipes 19 are contiguous with first end 11b in the tire axial direction D1 of center land 11, and second ends 19d of all sipes 19 are contiguous with second end 11c in the tire axial direction D1 of center land 11. That is, first end 19c of sipe 19 is contiguous with first center main groove 5, and second end 19d of sipe 19 is contiguous with second center main groove 6.

As a result, because sipes 19 at center land 11 which has large contact patch length will tend to deform so as to become wider, this will make it possible to effectively increase traction attributable to edges of sipes 19 when on a snowy road surface. Accordingly, at center land 11, it will be possible, for example, to effectively improve performance on snowy road surfaces as a result of provision of traction.

Moreover, a constitution may be adopted in which, e.g., as is the case in the present embodiment, a pair of straight portions 19a are arranged at either end in the tire axial direction D1 of sipe 19, and zigzag portion 19b is arranged between the pair of straight portions 19a, 19a. Furthermore, sipes 19 and slits 13 of center land 11 may, e.g., as is the case in the present embodiment, be inclined in the same direction (second inclined direction) D5 with respect to the tire axial direction D1.

Next, the constitution of first mediate land 9 will be described with reference to FIG. 8.

Figure 8:
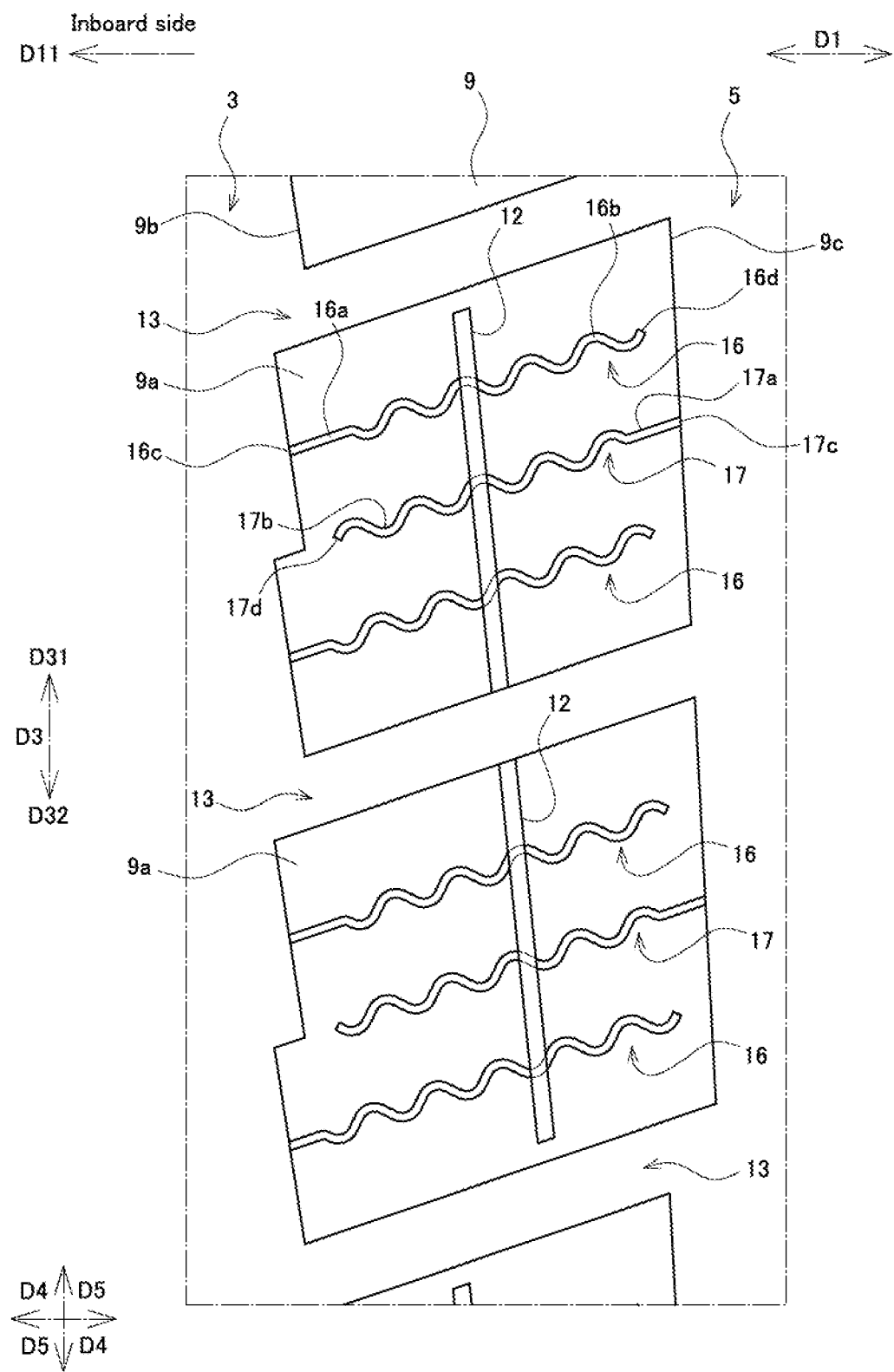
FIG. 8 is a drawing showing the principal components of a first mediate land associated with same embodiment as they would exist if unwrapped so as to lie in a single plane.

As shown in FIG. 8, at first mediate land 9, first ends 16c, 17c of all sipes 16, 17 are contiguous with side ends 9b, 9c in the tire axial direction D1 of first mediate land 9. That is, first end 16c, 17c of each sipe 16, 17 is contiguous with main groove 3, 5. This makes it possible to ensure that sipes 16, 17 will tend to widen.

On the other hand, second ends 16d, 17d of all sipes 16, 17 are separated from side ends 9c, 9b in the tire axial direction D1 of first mediate land 9. That is, second end 16d, 17d of each sipe 16, 17 is separated from main groove 5, 3. As a result, this makes it possible to suppress reduction in rigidity at first mediate land 9. Thus, at first mediate land 9, it will be possible, for example, to achieve both performance on dry road surfaces as a result of ensuring good rigidity and performance on snowy road surfaces as a result of provision of traction.

Moreover, outer end 9b of first mediate land 9 is contiguous with first sipe (sometimes referred to as "first mediate sipe") 16 but is separated from second sipe (sometimes referred to as "second mediate sipe") 17, and inner end 9c of first mediate land 9 is contiguous with second sipe 17 but is separated from first sipe 16. As a result, at first mediate land 9, it will be possible to suppress occurrence of differences in rigidity in the tire axial direction D1.

Moreover, whereas first end 19c and second end 19d of center sipe 19 are respectively contiguous with side ends 11b, 11c of center land 11, only first end 14c of first shoulder sipe 14 is contiguous with side end 7b of first shoulder land 7, and so the rigidity of center land 11 tends to be lower than the rigidity of first shoulder land 7. To address this, the number of second sipes 17 is less than the number of first sipes 16.

As a result, it will be possible suppress lowering of rigidity in a region toward the interior in the tire axial direction D1 of first mediate land 9, i.e., in a region toward center land 11. Accordingly, it will be possible to achieve well-balanced rigidity at center land 11, first mediate land 9, and first shoulder land 7, for example. Moreover, it is preferred that lengths in the tire axial direction D1 of sipes 16, 17 be, for example, not less than 67% (=2/3) of length (e.g., maximum length) in the tire axial direction D1 of block 9a, and it is more preferred that this be, for example, not less than 75% (=3/4) thereof.

Furthermore, a constitution may be adopted in which, e.g., as is the case in the present embodiment, at first sipe 16, straight portion 16a is arranged toward the exterior in the tire axial direction D1 of sipe 16, and zigzag portion 16b is arranged toward the interior in the tire axial direction D1 of sipe 16. Furthermore, a constitution may be adopted in which, e.g., as is the case in the present embodiment, at second sipe 17, straight portion 17a is arranged toward the interior in the tire axial direction D1 of sipe 17, and zigzag portion 17b is arranged toward the exterior in the tire axial direction D1 of sipe 17.

Furthermore, at sipes 16, 17 in first mediate land 9, straight portions 16a, 17a are contiguous with side ends 9b, 9c of first mediate land 9, and zigzag portions 16b, 17b are separated from side ends 9c, 9b of first mediate land 9. Furthermore, sipes 16, 17 and slits 13 of first mediate land 9 may, e.g., as is the case in the present embodiment, be inclined in the same direction (second inclined direction) D5 with respect to the tire axial direction D1.

Moreover as shown in FIG. 5 through FIG. 9, slits 13 of respective lands 7, 8, 9, 10, 11 may, e.g., as is the case in the present embodiment, be inclined in the same direction (second inclined direction) D5 with respect to the tire axial direction D1. Furthermore, sipes 14, 15, . . . , 18, 19 of respective lands 7, 8, 9, 10, 11 may, e.g., as is the case in the present embodiment, be inclined in the same direction (second inclined direction) D5 with respect to the tire axial direction D1.

As described above, as in the present embodiment, it is preferred that the pneumatic tire 1 includes a plurality of main grooves 3, 4, 5, 6 extending in a tire circumferential direction D3, and a plurality of lands 7, 8, 9, 10, 11 that are partitioned by the plurality of main grooves 3, 4, 5, 6 and a pair of contact patch ends 2d, 2e; wherein the plurality of lands 7, 8, 9, 10, 11 comprise first and second shoulder lands 7, 8 arranged so as to be outwardmost in a tire axial direction D1, and a center land 11 arranged so as to be nearest a tire equatorial plane S1;

the center land 11 comprises a plurality of center sipes 19;

all of the center sipes 19 are respectively contiguous with a first end 11b and a second end 11c in the tire axial direction D1 of the center land 11;

the first shoulder land 7 comprises a plurality of first shoulder sipes 14; and all of the first shoulder sipes 14 are contiguous with an outer end 7b in the tire axial direction D1 of the first shoulder land 7 but are separated from an inner end 7c in the tire axial direction D1 of the first shoulder land 7.

In accordance with such constitution, to address the fact that contact patch length in regions toward the interior in the tire axial direction D1 increases when the vehicle is going straight ahead, all center sipes 19 are respectively contiguous with first end 11b and second end 11c of center land 11. As a result, because center sipes 19, a large number of which come in contact with the ground, will tend to deform so as to become wider, this will make it possible to increase traction attributable to edges of center sipes 19 when on a snowy road surface.

Furthermore, because first shoulder sipe 14 is contiguous with outer end 7b of first shoulder land 7, it is possible to ensure that first shoulder sipe 14 will tend to widen. Moreover, because first shoulder sipe 14 is separated from inner end 7c of first shoulder land 7, it is possible to suppress reduction in rigidity of first shoulder land 7.

Moreover, because first shoulder sipe 14 is separated not from outer end 7b of first shoulder land 7 but from inner end 7c, it will be possible even in situations in which the actual locations of the contact patch ends vary in the tire axial direction D1 to cause first shoulder sipe 14 to be separated from inner end 7c of first shoulder land 7. As a result, this makes it possible to definitively suppress reduction in rigidity at first shoulder land 7. It will therefore be possible to suppress reduction in rigidity at land 7 while ensuring good performance on snowy road surfaces.

Further, as in the present embodiment, it is preferred that the pneumatic tire 1 includes a configuration in which:

the second shoulder land 8 comprises a plurality of second shoulder sipes 15;

total length of the plurality of first shoulder sipes 14 is greater than total length of the plurality of second shoulder sipes 15; and all of the second shoulder sipes 15 are respectively contiguous with an outer end 8b and an inner end 8c in the tire axial direction D1 of the second shoulder land 8.

In accordance with such constitution, because it is possible to increase lengths of edges at sipes 14 in first shoulder land 7, this will make it possible to achieve increase in traction attributable to edges of sipes 14 of first shoulder land 7. On the other hand, because first shoulder sipe 14 is separated from inner end 7c of first shoulder land 7, it is possible to suppress reduction in rigidity of first shoulder land 7.

Furthermore, because it is possible to suppress occurrence of a situation in which the lengths of sipes 15 at second shoulder land 8 would otherwise be too large, this makes it possible to suppress reduction in rigidity at second shoulder land 8. On the other hand, second shoulder sipe 15 is respectively contiguous with outer end 8b and inner end 8c of second shoulder land 8. As a result, because second shoulder sipes 15 will tend to deform so as to become wider, this will make it possible to increase traction attributable to edges of second shoulder sipes 15 when on a snowy road surface.

Further, as in the present embodiment, it is preferred that the pneumatic tire 1 includes a configuration in which:

the plurality of lands 7, 8, 9, 10, 11 further comprise a first mediate land 9 which is arranged between the first shoulder land 7 and the center land 11;

the first mediate land 9 comprises a plurality of mediate sipes 16, 17; and first ends 16c, 17c of all of the mediate sipes 16, 17 are contiguous with at least one side end 9b, 9c in the tire axial direction D1 of the mediate land 9, and second ends 16d, 17d of all of the mediate sipes 16, 17 are separated from the at least one side end 9*b*, 9*c* in the tire axial direction D1 of the mediate land 9.

In accordance with such constitution, because first ends 16*c*, 17*c* of mediate sipes 16, 17 are contiguous with side ends 9*b*, 9*c* of first mediate land 9, it is possible to ensure that mediate sipes 16, 17 will tend to widen. On the other hand, because second ends 16*d*, 17*d* of mediate sipes 16, 17 are separated from side ends 9*c*, 9*b* of first mediate land 9, it is possible to suppress reduction in rigidity of first mediate land 9.

Further, as in the present embodiment, it is preferred that the pneumatic tire 1 includes a configuration in which:

the first mediate land 9 comprises a plurality of first mediate sipes 16 and a plurality of second mediate sipes 17;

first ends 16*c* of all of the first mediate sipes 16 are contiguous with an outer end 9*b* in the tire axial direction D1 of the first mediate land 9, and second ends 16*d* of all of the first mediate sipes 16 are separated from an inner end 9*c* in the tire axial direction D1 of the first mediate land 9; and first ends 17*c* of all of the second mediate sipes 17 are contiguous with an inner end 9*c* in the tire axial direction D1 of the first mediate land 9, and second ends 17*d* of all of the second mediate sipes 17 are separated from an outer end 9*b* in the tire axial direction D1 of the first mediate land 9.

In accordance with such constitution, outer end 9*b* of mediate land 9 is contiguous with first mediate sipe 16 but is separated from second mediate sipe 17, and inner end 9*c* of mediate land 9 is contiguous with second mediate sipe 17 but is separated from first mediate sipe 16. As a result, at mediate land 9, it will be possible to suppress occurrence of differences in rigidity in the tire axial direction D1.

Further, as in the present embodiment, it is preferred that the pneumatic tire 1 includes a configuration in which:

a number of the plurality of second mediate sipes 17 is less than a number of the plurality of first mediate sipes 16.

In accordance with such constitution, to address the tendency for rigidity of center land 11 to be lower than rigidity of first shoulder land 7, the number of mediate sipes 17 that are contiguous with inner end 9*c* of mediate land 9 is less than the number of mediate sipes 16 that are contiguous with outer end 9*b* of mediate land 9. As a result, it will be possible suppress lowering of rigidity in a region toward the interior in the tire axial direction D1 of mediate land 9, i.e., in a region toward center land 11.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that total length of sipes 14 at first shoulder land 7 is greater than total length of sipes 15 at second shoulder land 8. However, pneumatic tire 1 is not limited to such constitution.

For example, it is also possible to adopt a constitution in which total length of sipes 14 at first shoulder land 7 is less than total length of sipes 15 at second shoulder land 8. Furthermore, it is also possible, for example, to adopt a constitution in which total length of sipes 14 at first shoulder land 7 is the same as total length of sipes 15 at second shoulder land 8.

(2) Furthermore, the constitution of pneumatic tire 1 associated with the foregoing embodiment is such that sipes 15 at second shoulder land 8 are all respectively contiguous with side ends 8*b*, 8*c* of second shoulder land 8. However, pneumatic tire 1 is not limited to such constitution. For example, it is also possible to adopt a constitution in which at least one sipe 15 at second shoulder land 8 is separated from at least one side end 8*b*, 8*c* of second shoulder land 8.

(3) Furthermore, the constitution of pneumatic tire 1 associated with the foregoing embodiment is such that first ends 16*c*, 17*c* of all sipes 16, 17 at first mediate land 9 are contiguous with side ends 9*b*, 9*c* of mediate land 9, and second ends 16*d*, 17*d* of all sipes 16, 17 at first mediate land 9 are separated from side ends 9*c*, 9*b* of mediate land 9. However, pneumatic tire 1 is not limited to such constitution.

For example, it is also possible to adopt a constitution in which at least one sipe 16, 17 at first mediate land 9 is respectively contiguous with outer end 9*b* and inner end 9*c* of first mediate land 9. Furthermore, it is also possible, for example, to adopt a constitution in which at least one sipe 16, 17 at first mediate land 9 is respectively separated from both outer end 9*b* and inner end 9*c* of first mediate land 9.

(4) Furthermore, the constitution of pneumatic tire 1 associated with the foregoing embodiment is such that outer end 9*b* of first mediate land 9 is contiguous with some sipes 16 of first mediate land 9, and inner end 9*c* of first mediate land 9 is contiguous with some sipes 17 of first mediate land 9. However, pneumatic tire 1 is not limited to such constitution.

For example, it is also possible to adopt a constitution in which outer end 9*b* of first mediate land 9 is contiguous with all sipes 16, 17 of first mediate land 9, and inner end 9*c* of first mediate land 9 is separated from all sipes 16, 17 of first mediate land 9. Furthermore, it is also possible, for example, to adopt a constitution in which inner end 9*c* of first mediate land 9 is contiguous with all sipes 16, 17 of first mediate land 9, and outer end 9*b* of first mediate land 9 is separated from all sipes 16, 17 of first mediate land 9.

(5) Furthermore, the constitution of pneumatic tire 1 associated with the foregoing embodiment is such that the number of second sipes 17 at first mediate land 9 is less than the number of first sipes 16 at first mediate land 9. However, pneumatic tire 1 is not limited to such constitution.

For example, it is also possible to adopt a constitution in which the number of second sipes 17 at first mediate land 9 is greater than the number of first sipes 16 at first mediate land 9. Furthermore, it is also possible, for example, to adopt a constitution in which the number of second sipes 17 at first mediate land 9 is the same as the number of first sipes 16 at first mediate land 9.

(6) Furthermore, the constitution of pneumatic tire 1 associated with the foregoing embodiment is such that there is one land 11 that intersects tire equatorial plane S1, that land being center land 11 which is arranged nearest to tire equatorial plane S1. However, pneumatic tire 1 is not limited to such constitution.

For example, it is also possible to adopt a constitution in which, for example, no land intersects tire equatorial plane S1; and it is also possible to adopt a constitution in which, for example, two lands intersect tire equatorial plane S1. Whereas such constitutions will comprise two center lands 11 that are arranged nearest to tire equatorial plane S1, it is sufficient that, of the first and second center lands 11 and the first and second shoulder lands 7, 8, that first center land 11 and that first shoulder land 7 which are arranged toward the first axial direction D11 have the prescribed constitution.

Note that what is meant by the prescribed constitution is a constitution in which all sipes 19 at first center land 11 are respectively contiguous with first end 11b and second end 11c of first center land 11, and in which all sipes 14 at first shoulder land 7 are contiguous with outer end 7b of first shoulder land 7 but are separated from inner end 7c of first shoulder land 7.

(7) Furthermore, the constitution of pneumatic tire 1 associated with the foregoing embodiment is such that this is a tire for which a vehicle mounting direction is indicated. However, pneumatic tire 1 is not limited to such constitution. For example, it is also possible to adopt a constitution in which pneumatic tire 1 is a tire for which a vehicle mounting direction is not indicated. More specifically, the tread pattern may be a tread pattern that exhibits point symmetry about an arbitrary point on the tire equator, or may be a tread pattern that exhibits line symmetry about the tire equator.

The invention claimed is:

1. A pneumatic tire comprising a plurality of main grooves extending in a tire circumferential direction, and a plurality of lands that are partitioned by the plurality of main grooves and a pair of contact patch ends; wherein
the plurality of lands comprise first and second shoulder lands arranged so as to be outwardmost in a tire axial direction, and a center land arranged so as to be nearest a tire equatorial plane;
the center land comprises a plurality of center sipes;
all of the center sipes are respectively contiguous with a first end and a second end in the tire axial direction of the center land;
the first shoulder land comprises a plurality of first shoulder sipes;
all of the first shoulder sipes are contiguous with an outer end in the tire axial direction of the first shoulder land but are separated from an inner end in the tire axial direction of the first shoulder land;
the second shoulder land comprises a plurality of second shoulder sipes;
total length of the plurality of first shoulder sipes is greater than total length of the plurality of second shoulder sipes;
all of the second shoulder sipes are respectively contiguous with an outer end and an inner end in the tire axial direction of the second shoulder land;
the plurality of first shoulder sipes comprise at least one first straight portion which extends in straight fashion, and at least one first zigzag portion which extends in zigzag fashion;
the plurality of second shoulder sipes comprise at least one third straight portion which extends in straight fashion, and at least one third zigzag portion which extends in zigzag fashion;
the fractional amount of zigzag portions at the plurality of first shoulder sipes is greater than the fractional amount of zigzag portions at the plurality of second shoulder sipes; and the fractional amount of zigzag portions is the ratio of the total lengths of the zigzag portions to the total lengths of the sipes.

2. The pneumatic tire according to claim 1 wherein
the plurality of lands further comprise a first mediate land which is arranged between the first shoulder land and the center land;
the first mediate land comprises a plurality of mediate sipes; and
first ends of all of the mediate sipes are contiguous with at least one side end in the tire axial direction of the mediate land, and second ends of all of the mediate sipes are separated from the at least one side end in the tire axial direction of the mediate land.

3. The pneumatic tire according to claim 1 wherein
the plurality of lands further comprise a first mediate land which is arranged between the first shoulder land and the center land;
the first mediate land comprises a plurality of first mediate sipes and a plurality of second mediate sipes;
first ends of all of the first mediate sipes are contiguous with an outer end in the tire axial direction of the first mediate land, and second ends of all of the first mediate sipes are separated from an inner end in the tire axial direction of the first mediate land; and
first ends of all of the second mediate sipes are contiguous with an inner end in the tire axial direction of the first mediate land, and second ends of all of the second mediate sipes are separated from an outer end in the tire axial direction of the first mediate land.

4. The pneumatic tire according to claim 3 wherein a number of the plurality of second mediate sipes is less than a number of the plurality of first mediate sipes.

5. The pneumatic tire according to claim 3 wherein
at least one of the first mediate sipes comprises at least one fourth straight portion which extends in straight fashion, and at least one fourth zigzag portion which extends in zigzag fashion; and
at least one of the second mediate sipes comprises at least one fifth straight portion which extends in straight fashion, and at least one fifth zigzag portion which extends in zigzag fashion.

6. The pneumatic tire according to claim 5 wherein total length of the at least one fourth zigzag portion is greater than total length of the at least one fourth straight portion; and
total length of the at least one fifth zigzag portion is greater than total length of the at least one fifth straight portion.

7. The pneumatic tire according to claim 6 wherein
the at least one fourth straight portion includes the first end of the at least one first mediate sipe;
the at least one fourth zigzag portion includes the second end of the at least one first mediate sipe;
the at least one fifth straight portion includes the first end of the at least one second mediate sipe; and
the at least one fifth zigzag portion includes the second end of the at least one second mediate sipe.

8. The pneumatic tire according to claim 3 wherein
the plurality of lands further comprise a second mediate land which is arranged between the second shoulder land and the center land;
the second mediate land comprises a plurality of third mediate sipes; and
all of the third mediate sipes are respectively contiguous with an outer end and an inner end in the tire axial direction of the second mediate land.

9. The pneumatic tire according to claim 8 wherein total length of the pluralities of first and second mediate sipes is greater than total length of the plurality of third mediate sipes.

10. The pneumatic tire according to claim 8 wherein
at least one of the third mediate sipes comprises at least one sixth straight portion which extends in straight fashion, and at least one sixth zigzag portion which extends in zigzag fashion; and
total length of the at least one sixth straight portion is greater than total length of the at least one sixth zigzag portion.

11. The pneumatic tire according to claim 1 wherein total length of the at least one first zigzag portion is greater than total length of the at least one first straight portion.

12. The pneumatic tire according to claim 11 wherein
the at least one first zigzag portion includes an outer end in the tire axial direction of the at least one first shoulder sipe; and
the at least one first straight portion includes an inner end in the tire axial direction of the at least one first shoulder sipe.

13. The pneumatic tire according to claim 1 wherein at least one of the center sipes comprises at least one second straight portion which extends in straight fashion, and at least one second zigzag portion which extends in zigzag fashion.

14. The pneumatic tire according to claim 13 wherein total length of the at least one second zigzag portion is greater than total length of the at least one second straight portion.

15. The pneumatic tire according to claim 14 wherein
the at least one second straight portion comprises a second inner straight portion and a second outer straight portion;
the at least one second zigzag portion comprises a second middle zigzag portion; and
the second inner straight portion and the second outer straight portion are arranged so as to straddle the second middle zigzag portion in the tire axial direction.

16. The pneumatic tire according to claim 1 wherein total length of the at least one third straight portion is greater than total length of the at least one third zigzag portion.

17. The pneumatic tire according to claim 16 wherein
the at least one third straight portion comprises a third inner straight portion and a third outer straight portion;
the at least one third zigzag portion comprises a third middle zigzag portion; and
the third inner straight portion and the third outer straight portion are arranged so as to straddle the third middle zigzag portion in the tire axial direction.

18. A pneumatic tire comprising:
a plurality of main grooves extending in a tire circumferential direction,
a plurality of lands that are partitioned by the plurality of main grooves and a pair of contact patch ends and
an indicator region that indicates an orientation in which the tire is to be mounted on a vehicle; wherein
the plurality of lands comprise
a first shoulder land arranged in inwardmost fashion when the tire is mounted on the vehicle,
a second shoulder land arranged in outwardmost fashion when the tire is mounted on the vehicle,
a center land arranged so as to be nearest a tire equatorial plane;
the center land comprises a plurality of center sipes;
all of the center sipes are respectively contiguous with a first end and a second end in the tire axial direction of the center land;
the first shoulder land comprises a plurality of first shoulder sipes;
all of the first shoulder sipes are contiguous with an outer end in the tire axial direction of the first shoulder land but are separated from an inner end in the tire axial direction of the first shoulder land;
the second shoulder land comprises a plurality of second shoulder sipes;
total length of the plurality of first shoulder sipes is greater than total length of the plurality of second shoulder sipes;
all of the second shoulder sipes are respectively contiguous with an outer end and an inner end in the tire axial direction of the second shoulder land;
the plurality of first shoulder sipes comprise at least one first straight portion which extends in straight fashion, and at least one first zigzag portion which extends in zigzag fashion;
the plurality of second shoulder sipes comprise at least one third straight portion which extends in straight fashion, and at least one third zigzag portion which extends in zigzag fashion; and
the fractional amount of zigzag portions at the plurality of first shoulder sipes is greater than the fractional amount of zigzag portions at the plurality of second shoulder sipes; and the fractional amount of zigzag portions is the ratio of the total lengths of the zigzag portions to the total lengths of the sipes.

19. A pneumatic tire comprising a plurality of main grooves extending in a tire circumferential direction, and a plurality of lands that are partitioned by the plurality of main grooves and a pair of contact patch ends; wherein
the plurality of lands comprise
first and second shoulder lands arranged so as to be outwardmost in a tire axial direction,
a center land arranged so as to be nearest a tire equatorial plane,
a first mediate land which is arranged between the first shoulder land and the center land,
a second mediate land which is arranged between the second shoulder land and the center land;
the center land comprises a plurality of center sipes;
all of the center sipes are respectively contiguous with a first end and a second end in the tire axial direction of the center land;
the first shoulder land comprises a plurality of first shoulder sipes;
all of the first shoulder sipes are contiguous with an outer end in the tire axial direction of the first shoulder land but are separated from an inner end in the tire axial direction of the first shoulder land;
the second shoulder land comprises a plurality of second shoulder sipes;
total length of the plurality of first shoulder sipes is greater than total length of the plurality of second shoulder sipes;
all of the second shoulder sipes are respectively contiguous with an outer end and an inner end in the tire axial direction of the second shoulder land;
the plurality of first shoulder sipes comprise at least one first straight portion which extends in straight fashion, and at least one first zigzag portion which extends in zigzag fashion;
the plurality of second shoulder sipes comprise at least one third straight portion which extends in straight fashion, and at least one third zigzag portion which extends in zigzag fashion;
the fractional amount of zigzag portions at the plurality of first shoulder sipes is greater than the fractional amount of zigzag portions at the plurality of second shoulder sipes; and the fractional amount of zigzag portions is the ratio of the total lengths of the zigzag portions to the total lengths of the sipes;
the first mediate land comprises a plurality of first mediate sipes, and the plurality of first mediate sipes respectively comprise at least one fourth straight portion which extends in straight fashion, and at least one fourth zigzag portion which extends in zigzag fashion;

the second mediate land comprises a plurality of third mediate sipes, and the plurality of third mediate sipes respectively comprise at least one sixth straight portion which extends in straight fashion, and at least one sixth zigzag portion which extends in zigzag fashion;

the fractional amount of zigzag portions at the plurality of first mediate sipes is greater than the fractional amount of zigzag portions at the plurality of third mediate sipes, and the fractional amount of zigzag portions is the ratio of the total lengths of the zigzag portions to the total lengths of the sipes.

20. The pneumatic tire according to claim 19 wherein the tire further comprises an indicator region that indicates an orientation in which the tire is to be mounted on a vehicle;

the first shoulder land is arranged in inwardmost fashion when the tire is mounted on the vehicle, and a second shoulder land is arranged in outwardmost fashion when the tire is mounted on the vehicle.

\* \* \* \* \*